(12) United States Patent
Okada et al.

(10) Patent No.: US 7,570,848 B2
(45) Date of Patent: Aug. 4, 2009

(54) LENS ADJUSTING METHOD, LENS ADJUSTING DEVICE, AND OPTICAL SWITCH

(75) Inventors: Hideo Okada, Kawasaki (JP); Shinichi Wakana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 11/984,991

(22) Filed: Nov. 26, 2007

(65) Prior Publication Data
US 2008/0131119 A1    Jun. 5, 2008

(30) Foreign Application Priority Data
Dec. 5, 2006    (JP)    ............... 2006-328446

(51) Int. Cl.
G02B 6/35    (2006.01)
(52) U.S. Cl. .......................................... 385/19; 385/18
(58) Field of Classification Search .................. 385/16, 385/19; 395/16, 18, 19
See application file for complete search history.

(56) References Cited

U.S. PATENT DOCUMENTS 6,549,699 B2    4/2003    Belser et al.
6,631,222 B1    10/2003   Wagener et al.
6,657,770 B2 *  12/2003   Marom et al. ............... 359/290
6,879,745 B2 *   4/2005   Okayama ...................... 385/16

FOREIGN PATENT DOCUMENTS

JP    2004-501395    1/2004
JP    2004-70053     3/2004

* cited by examiner

*Primary Examiner*—Jerry T Rahll
(74) *Attorney, Agent, or Firm*—Fujitsu Patent Center

(57) ABSTRACT

An optical switch includes plural pairs of ports and first lenses, each of the ports emitting light in a diffused manner or receiving light input thereto in a collected manner, and the first lenses respectively collimating light emitted from the ports; a second lens that collects the light collimated by the first lenses; and an inclinable mirror that reflects the light collected by the second lens at different angles toward the second lens. A position of a first lens is adjusted based on a first distance between a core of the second lens and a portion of the second lens through which light collimated by the first lens passes.

10 Claims, 9 Drawing Sheets

LENS ADJUSTING METHOD, LENS ADJUSTING DEVICE, AND OPTICAL SWITCH

CROSS-REFERENCE TO RELATED APPLICATIONS

This application is based upon and claims the benefit of priority from the prior Japanese Patent Application No. 2006-328446, filed on Dec. 5, 2006, the entire contents of which are incorporated herein by reference.

BACKGROUND OF THE INVENTION

1. Field of the Invention

The present invention relates to an optical switch that switches communication paths in an optical communication system, and a lens adjusting method and a lens adjusting device for the optical switch.

2. Description of the Related Art

In the third generation optical communication system (multi-ring network), because of its large communication amount, an enormous amount of work is required if replacement of fiber codes and setting of wavelength are performed manually when communication paths are switched. Therefore, an optical switch (for example, Japanese Patent Laid-Open Publication No. 2004-70053) or an optical wavelength selecting switch (for example, U.S. Pat. No. 6,549,699) that enables flexible change of paths and a remote operation is used.

FIG. 9 is a perspective view showing a configuration of a conventional optical switch. Signal light input from an input port 911 is collimated by a lens 921, and is collected on a micro electro mechanical systems (MEMS) mirror 940 by a lens 903.

The signal light collected on the MEMS mirror 940 is reflected by the MEMS mirror 940 and passes through the lens 930 and a lens 924 to be collected at an output port 914. The signal light is then output from the port 914. An optical switch controls an angle θy of the MEMS mirror 940, thereby selecting a desirable output port from which the signal light is to be output, from among output ports 912 to 914.

FIG. 10 is a perspective view showing a configuration of a conventional optical wavelength selecting switch. Wavelength division multiplexing (WDM) light that includes plural signal light beams having different wavelengths is input from an input port 1011. The WDM light is collimated by a lens 1021 and is reflected by a light dividing device 1030 such as a diffraction grating, being divided into light beams of respective wavelengths. The reflected light beams are collected on plural mirrors (not shown) in a MEMS mirror 1050, respectively.

The signal light beams collected on the respective mirrors in the MEMS mirror 1050 are reflected from the MEMS mirror 1050 to pass through the lens 1040, and reflected by the light dividing device 1030 again. The reflected light beams are collected at output ports 1012 to 1014, respectively. The optical wavelength selecting switch controls the angle of each of the mirrors in the MEMS mirror 1050 to output each of the divided light beams to a desirable output port from among the output ports 1012 to 1014. Thus, a signal light beam having arbitrary wavelength is output.

Generally, a device that converts light into collimated light with a combination of a fiber and a collimator lens is called collimator. In an optical switch and an optical wavelength selecting switch, a collimator array in which plural collimators are arranged in an array for input and output is used. Light emitted from each collimator passes a collective lens in a collimated state, and is collected on a MEMS mirror.

However, since the collimated light beams pass at different points on the collective lens in the conventional optical switch, positions at which the light beams are collected cannot be consistent due to aberration of the collective lens. Such a problem is caused because aberration of lenses varies depending on positions on lenses. Aberration usually becomes large as the position shifts away from the center.

FIG. 11 is a plan view showing a configuration of a conventional optical switch. An optical switch 1100 includes a collimator array 1110, a lens 1120, and a mirror 1130. The lens 1120 is a lens whose aberration is relatively small and curvature of field is corrected to about 0.2%, and in which f=100 millimeters (mm). An axis 1141 is a virtual axis that passes the center of the lens 1120. Collimated light beams emitted from collimators 1111 and 1112 in the collimator array 1110 pass through the lens 1120 in a state of being parallel to each other, and are collected on the mirror 1130.

The collimator 1112 emits a collimated light beam along the axis 1141. The collimator 1111 emits a collimated light beam along an axis 1142 that is positioned away from the axis 1141 for a distance L (L=10 mm in this example). The collimated light beam emitted from the collimator 1111 and the collimated light beam emitted from the collimator 1112 are collected on different points due to the aberration of the lens 1120.

In this example, suppose that the collimated light beam emitted from the collimator 1111 is collected on a position 1151, and the collimated light beam emitted from the collimator 1112 is collected on a position 1152. A distance between the positions 1151 and 1152 is approximately 200 micrometers (μm). In this case, if the mirror 1130 is positioned at the position 1151, a difference d in positions at which the respective collimated light beams enter the mirror 1130 is caused.

FIG. 12 is a graph showing relation between the distance L and the difference d. In this example, since the distance L=10 mm, there is the difference d of approximately 20 μm. Even if the mirror 1130 is positioned at a position 1153 in the middle between the positions 1151 and 1152, there is the difference d of approximately 10 μm.

FIG. 13 is a plan view showing a configuration of a conventional optical switch. If it is assumed that a collimated light beam emitted from the collimator 1111 is not influenced by the aberration of the lens 1120, this collimated light beam is refracted at a refraction angel α by the lens 1120, and passes along an optical path 1311. The light beam that has passed along the optical path 1311 travels in parallel to the core of a lens in the collimator 1113 and is collected at a port of the collimator 1113. Thus, the light beam is output from the collimator 1113.

However, the collimated light beam emitted from the collimator 1111 is influenced by the aberration of the lens 1120 in fact. Therefore, this collimated light beam is refracted by the lens 1120 at a refraction angle β (>α), and passes along an optical path 1312. The light beam that has passed along the optical path 1312 is deviated from the core of the lens of the collimator 1113 by an angle γ, and the position at which the collimated light beam is collected is not completely consistent with a position of the port of the collimator 1113. As a result, coupling loss increases.

Deviation of an optical path on an axis X that occurs in an optical switch in which plural collimators are linearly arranged has been explained. If an optical switch in which plural collimators are arranged two-dimensionally or the optical wavelength selecting switch described above is used, deviation of the optical path on a Y axis is also necessary to be considered in addition to the deviation of the optical path on the X axis.

FIG. 14 is a front view of a mirror in a conventional optical wavelength selecting switch. FIG. 14 illustrates a mirror 1050a viewed from a direction of an axis Z. The mirror 1050a is one of the mirrors in the MEMS mirror 1050 of the optical wavelength selecting switch described above. In this example, the port 1011 described above is used as an output port, and the ports 1012 to 1014 are used as input ports.

Numerals 1412 to 1414 denote positions at which light beams emitted from the ports 1012 to 1014 enter the mirror 1050a. As shown in FIG. 14, the positions at which the light beams emitted from the ports 1012 to 1014 enter the mirror 1050a vary in a direction of a Y axis due to the aberration of the lens 1040.

FIG. 15 is a graph showing relation between wavelength and coupling efficiency of signal light in the optical wavelength selecting switch. A horizontal axis indicates wavelength (frequency) of signal light, and a vertical axis indicates coupling efficiency. Numerals 1512 to 1514 indicate coupling efficiency characteristics when light beams that have been emitted from the ports 1012 to 1014, entered the MEMS mirror 1050, reflected by the MEMS mirror 1050, and enter the port 1011.

As shown in FIG. 15, an effective transmission band-width 1521 at the port 1011 when a light beam is selected from among the light beams emitted from the ports 1012 to 1014 to be output becomes narrower than an effective transmission band-width 1522 at the port 1011, for example, when only the light beam from the port 1012 is output.

As described, in the conventional optical switch using the MEMS mirror and the optical wavelength selecting switch, light beams emitted from respective ports cannot be collected at one point on the MEMS mirror due to the aberration of a lens collecting the light beams on the MEMS lens. Therefore, coupling loss at an output port increases. Accordingly, performance of module is degraded.

SUMMARY OF THE INVENTION

It is an object of the present invention to at least solve the problems in the conventional technologies.

A lens adjusting method according to one aspect of the present invention is for an optical switch that includes plural pairs of ports and first lenses, a second lens, and an inclinable mirror. Diffusion light emitted from the ports are respectively collimated by the first lenses, collected into the mirror by the second lens, and reflected by the inclinable mirror to be input to one of the ports. The lens adjusting method includes measuring a first position at which an optical axis of light that passes a core of the second lens is received, and a second position at which an optical axis of light that is collimated by a first lens and does not pass the core is received; and adjusting a position of the first lens so that the second position coincides with the first position.

A lens adjusting device according to another aspect of the present invention is for an optical switch that includes plural pairs of ports and first lenses, a second lens, and an inclinable mirror. Diffusion light emitted from the ports are respectively collimated by the first lens, collected into the mirror by the second lens, and reflected by the inclinable mirror to be input to one of the ports. The lens adjusting device includes a measuring unit that receives light collected by the second lens and measures a first position at which an optical axis of light that passes a core of the second lens is received, and a second position at which an optical axis of light that is collimated by a first lens and does not pass the core is received; and a first adjusting unit that adjusts a position of the first lens so that the second position coincides with the first position.

An optical switch according to still another aspect of the present invention includes plural pairs of ports and first lenses, each of the ports emitting light in a diffused manner or receiving light input thereto in a collected manner, and the first lenses respectively collimating light emitted from the ports; a second lens that collects the light collimated by the first lenses; and an inclinable mirror that reflects the light collected by the second lens at different angles toward the second lens. A position of a first lens is adjusted based on a first distance between a core of the second lens and a portion of the second lens through which light collimated by the first lens passes.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention are explained in detail below with reference to the accompanying drawings.

Figure 1:
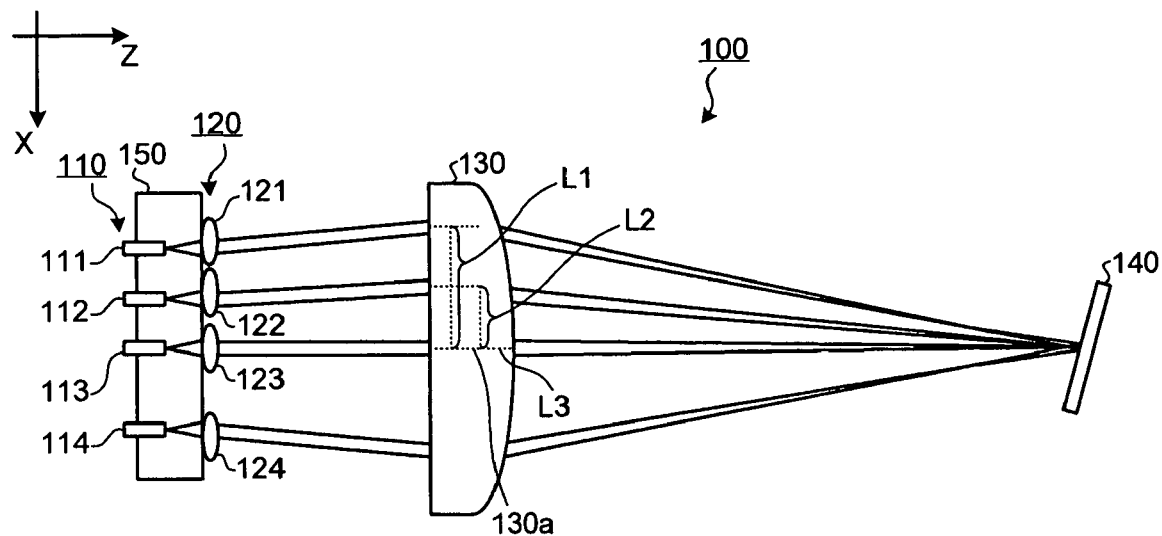
FIG. 1 is a schematic diagram of an optical switch according to an embodiment of the present invention.
Figure 2:
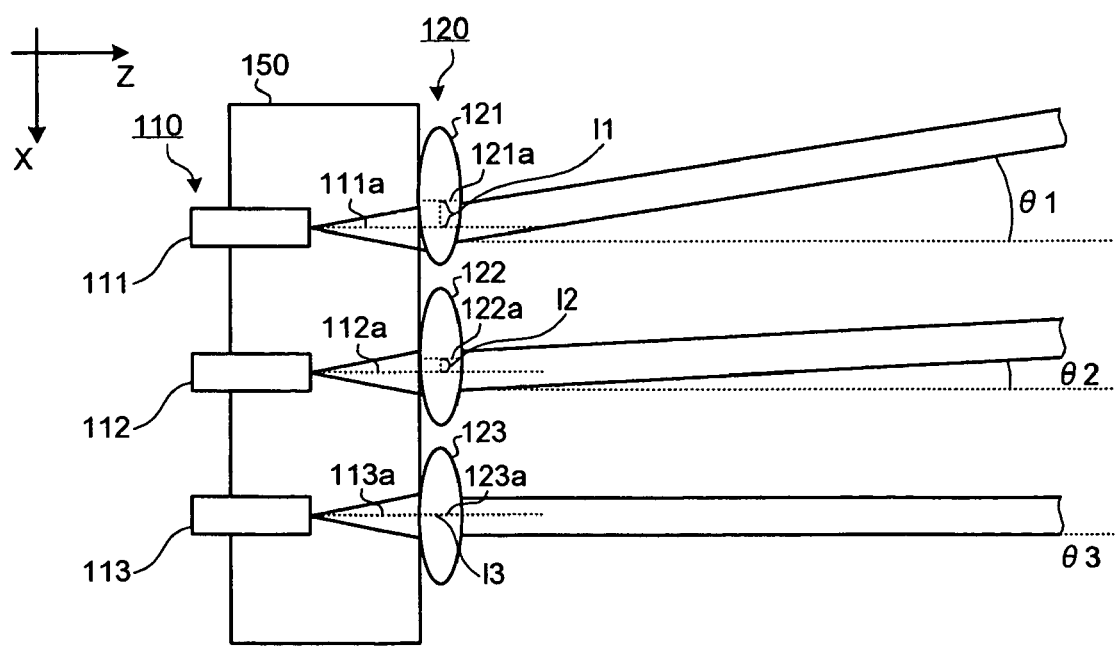
FIG. 2 is a partial enlarged view of FIG. 1.

FIG. 1 is a schematic diagram of an optical switch according to an embodiment of the present invention. FIG. 2 is a partial enlarged view of FIG. 1. As shown in FIG. 1, an optical switch 100 according to the embodiment includes a port unit 110 having plural ports 111 to 114, a lens unit 120 having plural lenses 121 to 124, a lens 130, and a mirror 140.

The port unit 110 is constituted of optical fibers or the like, and at least three ports are provided therein. The ports in the port unit 110 are used as an input port that emits light externally input in a diffused manner, and as an output port that outputs light collected and input thereto, to the outside of the optical switch 100. In this example, the ports 111 to 113 are used as the input ports and the port 114 is used as the output port.

The lenses in the lens unit 120 correspond to the ports in the port unit 110, respectively, and are provided at such positions that diffusion light beams from the corresponding ports can be collimated by the lenses. Each of the lenses in the lens unit 120 constitutes a collimator together with the corresponding port in the port unit 110. In this example, plural collimators constituted of the ports in the port unit 110 and the lenses in the lens unit 120, respectively, are linearly arranged along a direction of an X axis in FIG. 1 to form a collimator array 150.

The lens 130 is provided at such a position that collimated light beams that are collimated respectively by the lenses of the lens unit 120 can be collected by the lens 130. The mirror 140 is a MEMS mirror that changes optical paths by reflecting the light beams at different angles toward the lens 130. For example, the mirror 140 changes the angles by rotating about a Y axis that is perpendicular to the X axis and a Z axis, by a control of a mirror control unit not shown.

With this configuration, for example, when signal light beams are input to the ports 111 and 113, either one of the signal light beams can be selected to be output from the port 114 by controlling the angle of the mirror 140.

Moreover, the lenses 121 to 123 in the lens unit 120 are arranged by adjusting positions at which optical axes of the diffusion light beams emitted from the ports 111 to 113 pass through the lens 130, corresponding to relation between positions at which optical axes of the collimated light beams collimated by the lenses 121 to 123 pass through the lens 130 and a position of a core 130a of the lens 130.

Figure 11:
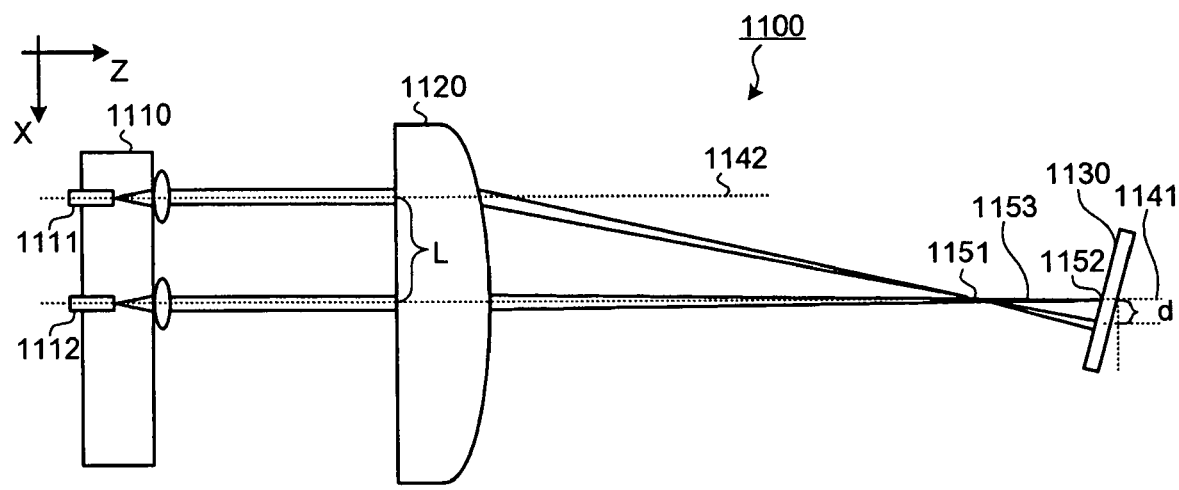
FIG. 11 is a plan view showing a configuration of a conventional optical switch.
Figure 12:
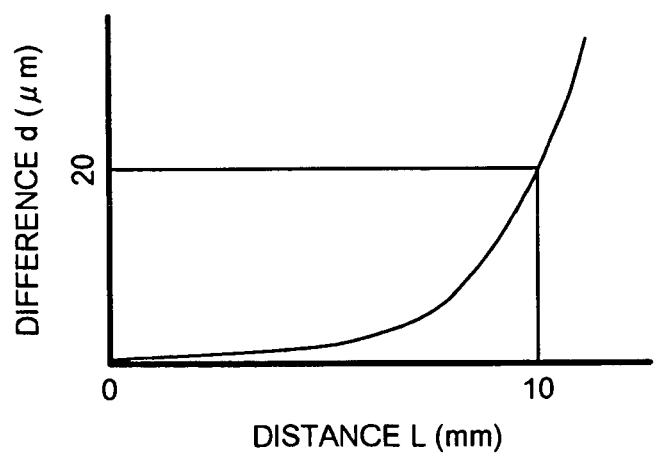
FIG. 12 is a graph showing relation between a distance L and a difference d.
Figure 13:
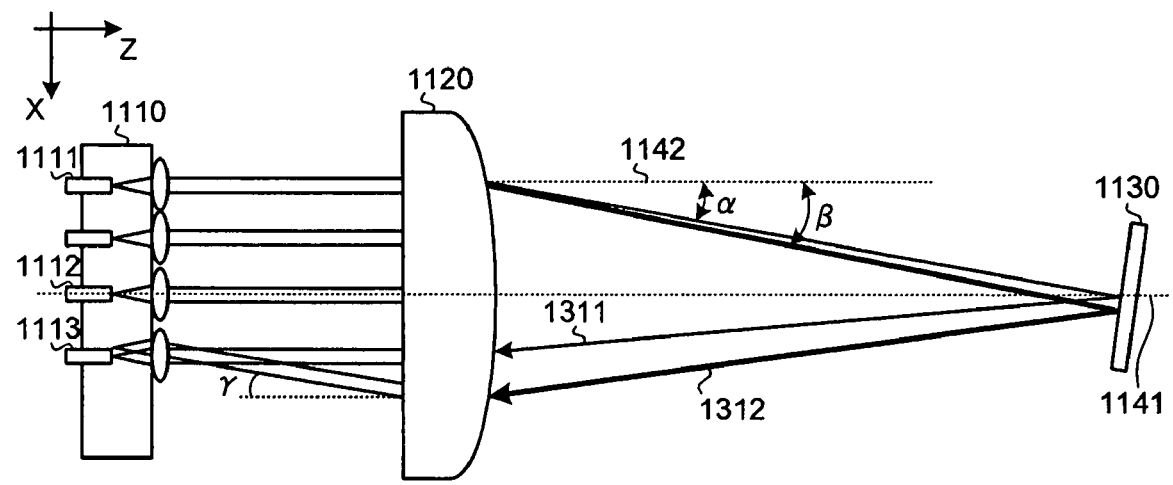
FIG. 13 is a plan view showing a configuration of a conventional optical switch.
Figure 14:
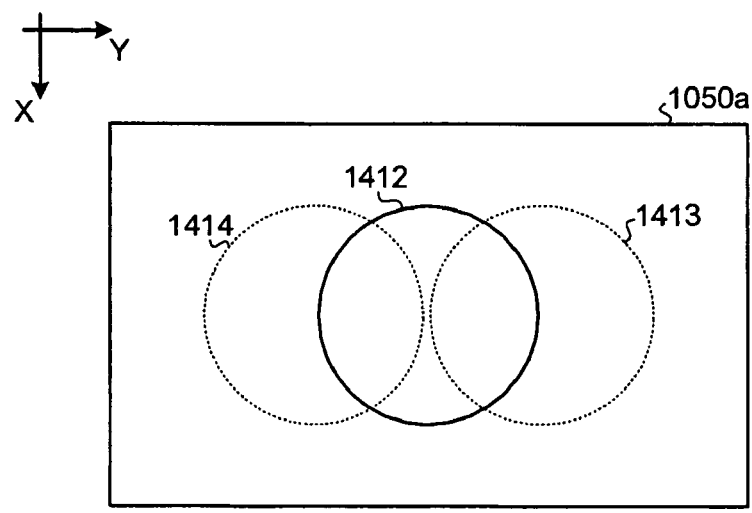
FIG. 14 is a front view of a mirror in a conventional optical wavelength selecting switch.
Figure 15:
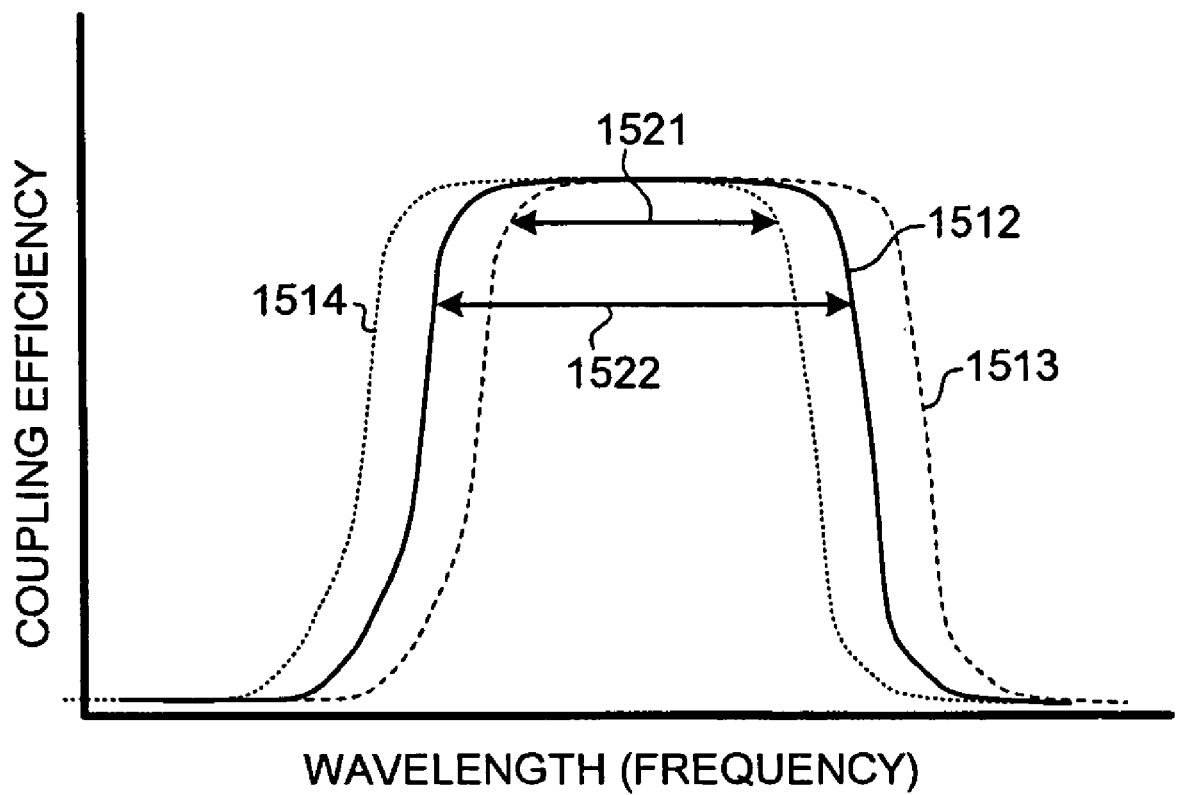
FIG. 15 is a graph showing relation between wavelength and coupling efficiency of signal light in the optical wavelength selecting switch.

For example, the lenses 121 to 123 are arranged such that as a distance (see L in FIG. 11) between a position at which an optical axis of a collimated light beam that is collimated by the lens unit 120 passes the lens 130 and a position of the core 130a of the lens 130 becomes large, a distance between a position at which an optical axis of a diffusion light beam emitted from the port unit 110 passes the lens unit 120 and a position of the core of the lenses 121 to 123 in the lens unit 120 becomes large.

In this example, a collimated light beam that is collimated by the lens 123 passes through the lens 130 at the core 130a. When distances between the position of the core 130a and positions at which optical axes of collimated light beams that have passed the lenses 121 to 123 pass the lens 130 are L1, L2, and L3, respectively, the distances have relation of L1>L2>L3=0.

As shown in FIG. 2, optical axes of diffusion light beams that are emitted from the ports 111 to 113 are expressed as 111a to 113a, and cores of the lenses 121 to 123 are expressed as 121a to 123a. When distances between positions at which the optical axes 111a to 113a pass through the lens unit 120 and positions of the cores 121a to 123a are l1 to l3, respectively, the distances have relation of l1>l2>l3=0.

Accordingly, when refraction angles of the diffusion light beams emitted from the ports 111 to 113 at the time of passing through the lenses 121 to 123 are θ1, θ2, and θ3, respectively, the refraction angles have relation of θ1>θ2>θ3=0. Therefore, the collimated light beams collimated by the lenses 121 to 123 enter the lens 130 at angles corresponding to the aberration of the lens 130.

Although only about the adjustment of the positions of the lenses 121 to 123 that correspond to the ports 111 to 123 and that are used as the input ports is explained herein, the position of the lens 124 that corresponds to the port 114 is also adjusted similarly.

Furthermore, while the case where the ports 111 to 113 are used as the input ports and the port 114 is used as the output port has been explained, for example, only the port 111 can be used as the input port and the ports 112 to 114 can be used as the output ports. In this case, by controlling the angle of the mirror 140, a port from which a signal light beam input from the port 111 is output can be selected from among the ports 112 to 114.

Moreover, the lenses in the lens unit 120 are positioned such that cores of the lenses are displaced from positions at which the diffusion light beams emitted from the port unit 110 pass the lens unit 120. In this example, since the ports in the port unit 110 are arranged linearly on the X axis, the lenses of the lens unit 120 are arranged at positions displaced on the X axis.

As described, according to the optical switch 100 of the embodiment, by adjusting the relative position between positions at which diffusion light beams emitted from the port unit 110 pass the lens unit 120 and positions of the cores of the lenses in the lens unit 120, a difference in a position at which light is collected on the mirror 140 caused by the aberration of the lens 130 can be corrected.

Figure 3:
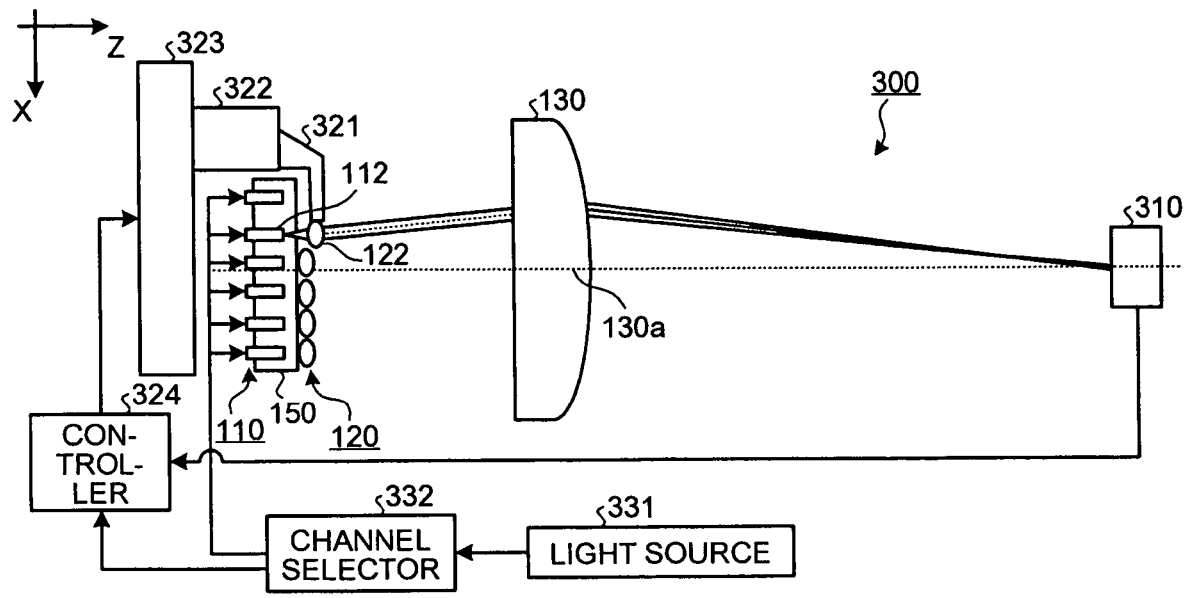
FIG. 3 is a block diagram of a lens adjusting device according to the embodiment.

FIG. 3 is a block diagram of a lens adjusting device according to the embodiment. A lens adjusting device 300 according to the embodiment includes a measuring unit 310, a lens hand 321, an XZ stage 322, a Y stage 323, a controller 324, a light source 331, and a channel selector 332.

The measuring unit 310 is arranged at such a position that light that has passed through the core 130a of the lens 130 can be received, and measures an optical axis position of the light as a first position. Moreover, the measuring unit 310 receives light that has been input to the collimator array 150 by the channel selector 332 and that has passed through the lens 130, and measures a position of an optical axis of the light as a second position.

Furthermore, the measuring unit 310 measures a distance between the core 130a of the lens 130 and a portion of the lens 130 through which the optical axis of the collimated light collimated by the lens unit 120 passes (see L1 and L2 in FIG. 1). In this example, since the position of the core 130a and the position at which the collimated light passes the lens 130 are shifted along the X axis, the measuring unit 310 measures the position of the received light on the X axis.

Moreover, the measuring unit 310 outputs information on the measured position of the optical axis to the controller 324. The measuring unit 310 is constituted of, for example, a beam profiler, an infrared ray (IR) camera, or a position sensitive detector (PSD).

The lens hand 321, the XZ stage 322, the Y stage 323, and the controller 324 constitute a lens arranging unit of the lens unit 120. The lens hand 321 holds the lens unit 120. The XZ stage 322 moves the lens hand 321 on the X axis and the Z axis. The Y stage 323 moves the XZ stage on the Y axis, which is perpendicular to the X axis and the Z axis.

The controller 324 controls movement of the lens hand 321, the XZ stage 322, and the Y stage 323 based on the information output from the measuring unit 310 to perform arrangement of the lens unit 120 and adjustment of the arranged position thereof. The controller 324 positions the lens unit 120 so that the lens unit 120 collimates diffusion light output from the port unit 110. The controller 324 adjusts the position of the lens unit 120 such that the second position coincides with the first position.

The light source 331 and the channel selector 332 constitute an input unit that inputs light to the port unit 110. The channel selector 332 selects one of the ports in the port unit 110 and inputs the light output from the light source 331 to the selected port.

The example in which the measuring unit 310 is arranged in advance at such a position that light that has passed the core 130a of the lens 130 can be received has been explained herein. However, the lens adjusting device 300 can further include an emitting unit 710 (see FIG. 7) and an arranging unit 810 (see FIG. 8) to arrange the lens 130 and to adjust the position of the lens 130.

In this case, the emitting unit 710 emits collimated light to the measuring unit 310. The emitting unit 710 includes, for example, a port 711 that emits light in a diffused manner and a lens 712 that collimates the diffusion light emitted from the port 711. Moreover, the emitting unit 710 can be arranged to be removed when the arrangement of the lens unit 120 and the adjustment of the position thereof are performed.

Furthermore, in this case, the measuring unit 310 receives the collimated light that is emitted from the emitting unit 710, and measures a position of an optical axis of the collimated light as a third position. Moreover, the measuring unit 310 measures a position of an optical axis of light that has been emitted from the emitting unit 710, that has passed through the lens 130, and that has been received at the measuring unit as a fourth position.

The arranging unit 810 arranges the lens 130 on an optical axis of the collimated light that is emitted from the emitting unit 710. Moreover, the arranging unit 810 adjusts the position of the lens 130 so that the fourth position coincides with the third position. The arranging unit 810 includes, for example, a lens hand 811 that holds the lens 130, an XZ stage 812 that moves the lens hand 811 on the X axis and the Z axis, and a Y stage 813 that moves the lens hand 811 on the Y axis, which is perpendicular to the X axis and the Z axis. The arranging unit 810 is controlled by the controller 324.

Figure 4:
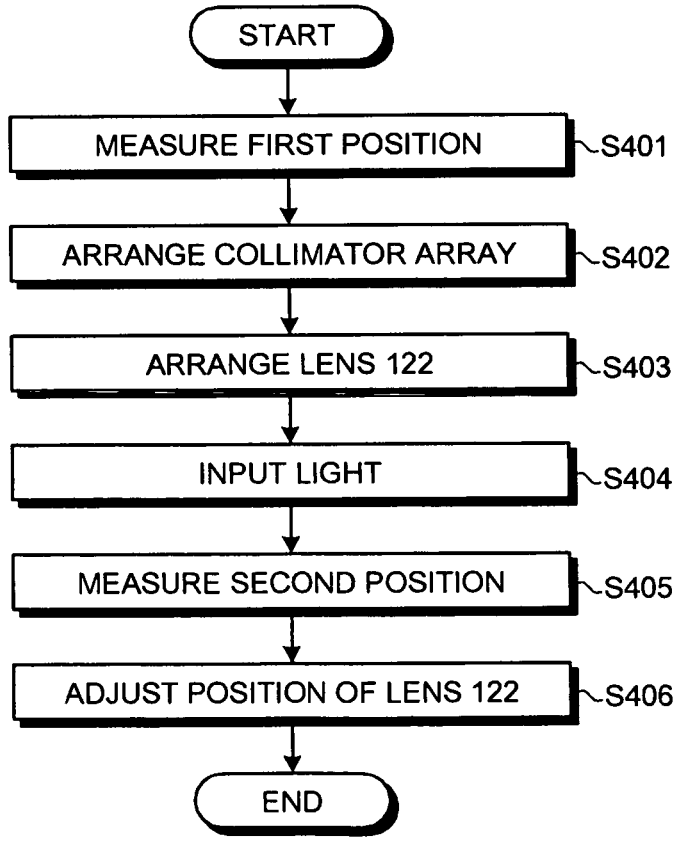
FIG. 4 is a flowchart of an operation of the lens adjusting device to adjust a lens unit 120 according to the embodiment.
Figure 5:
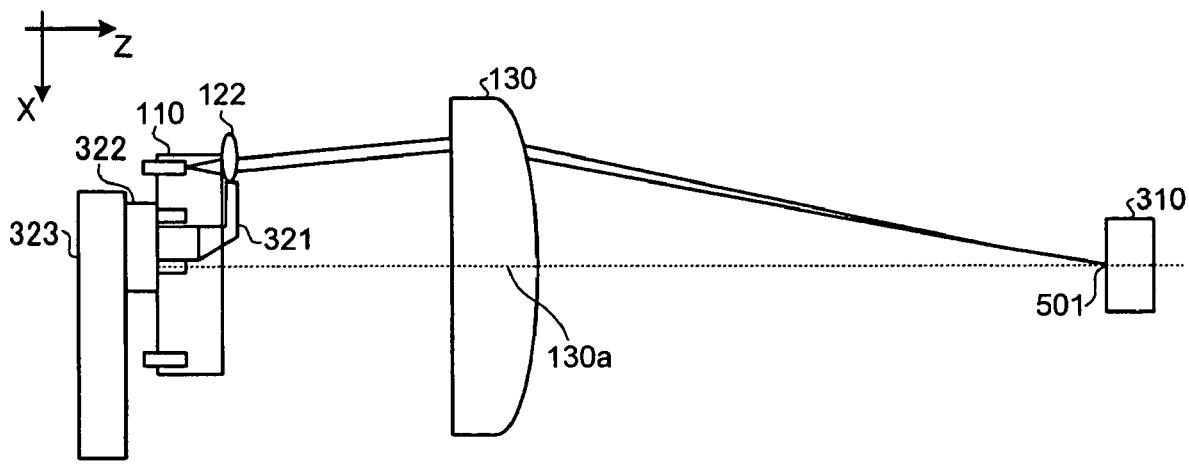
FIG. 5 is a schematic diagram showing adjustment of the lens unit 120 performed by the lens adjusting device according to the embodiment.

FIG. 4 is a flowchart of an operation of the lens adjusting device 300 to adjust the lens unit 120. FIG. 5 is a schematic diagram showing the adjustment of the lens unit 120 performed by the lens adjusting device 300. A case where the lens 122 is adjusted among the lenses in the lens unit 120 is explained herein.

As shown in FIG. 4, first, the measuring unit 310 receives light that has passed the core 130a of the lens 130, and measures a position of the optical axis (numeral 501 in FIG. 5) of the received light as the first position (step S401). This first position is to be a reference position when adjusting the lens unit 120. Next, the collimator array 150 is arranged (step S402). Subsequently, the controller 324 arranges the lens 122 at such a position that a diffusion light beam that is emitted from the corresponding port 112 is collimated by the lens 122 (step S403). The channel selector 332 then inputs light to the port 112 (step S404).

Next, the measuring unit 310 receives the light that has been input by the channel selector 332, and has passed through the lens 122 and the lens 130. The measuring unit 310 measures a position of the optical axis of the received light as the second position (step S405). The controller 324 then adjusts the position of the lens 122 so that the second position coincides with the first position (step S406). Thus, a series of operations ends.

The lens 122 whose position has been adjusted is fixed to the collimator array 150. For example, an ultraviolet cure adhesive is applied on the collimator array 150 in advance, and by applying ultraviolet rays to the adhesive after the position of the lens 122 is adjusted, the lens 122 can be fixed to the collimator array 150.

By the operation described above, a relative position between the position at which the diffusion light emitted from the port 112 passes the lens 122 and the position of the core of the lens 122 can be adjusted, and the difference in the position at which the light is collected caused by the aberration of the lens 130 can be corrected. Other lenses in the lens unit 120 can also be adjusted by the same operation.

Figure 6:
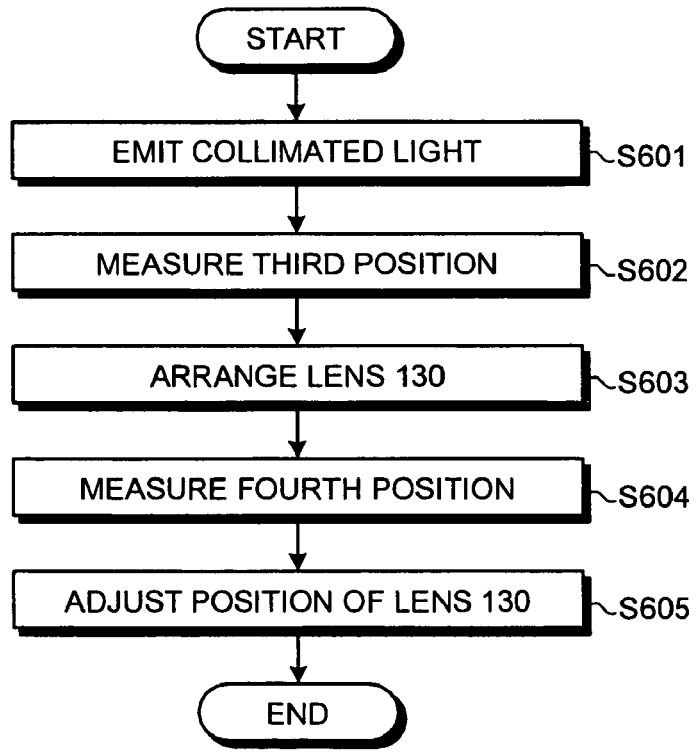
FIG. 6 is a flowchart of an operation of the lens adjusting device to adjust a lens 130 according to the embodiment.
Figure 7:
FIG. 7 is a schematic diagram showing adjustment of the lens 130 performed by the lens adjusting device according to the embodiment.
Figure 8:
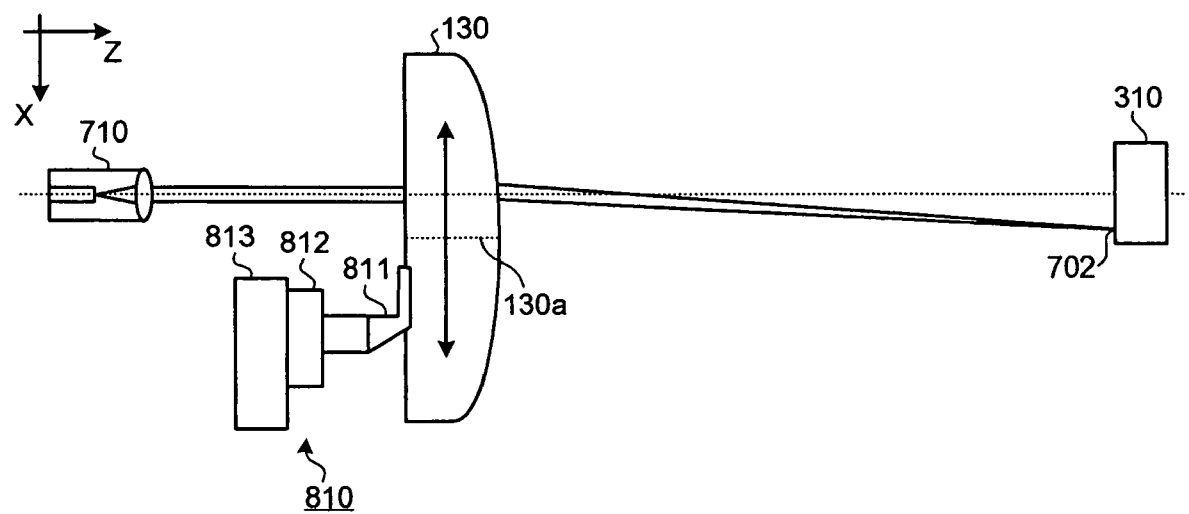
FIG. 8 is another schematic diagram showing adjustment of the lens 130 performed by the lens adjusting device according to the embodiment.
Figure 9:
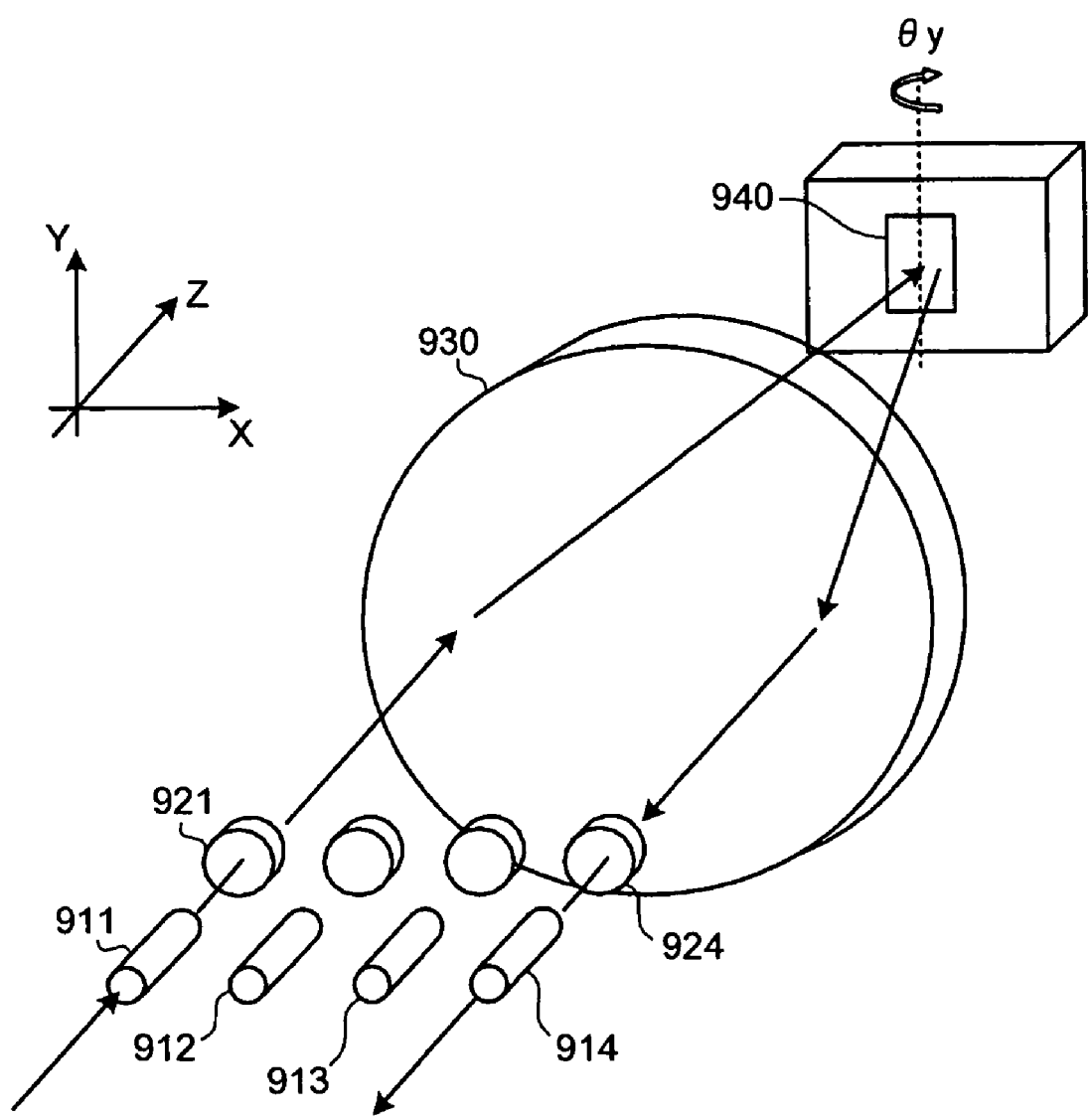
FIG. 9 is a perspective view showing a configuration of a conventional optical switch.
Figure 10:
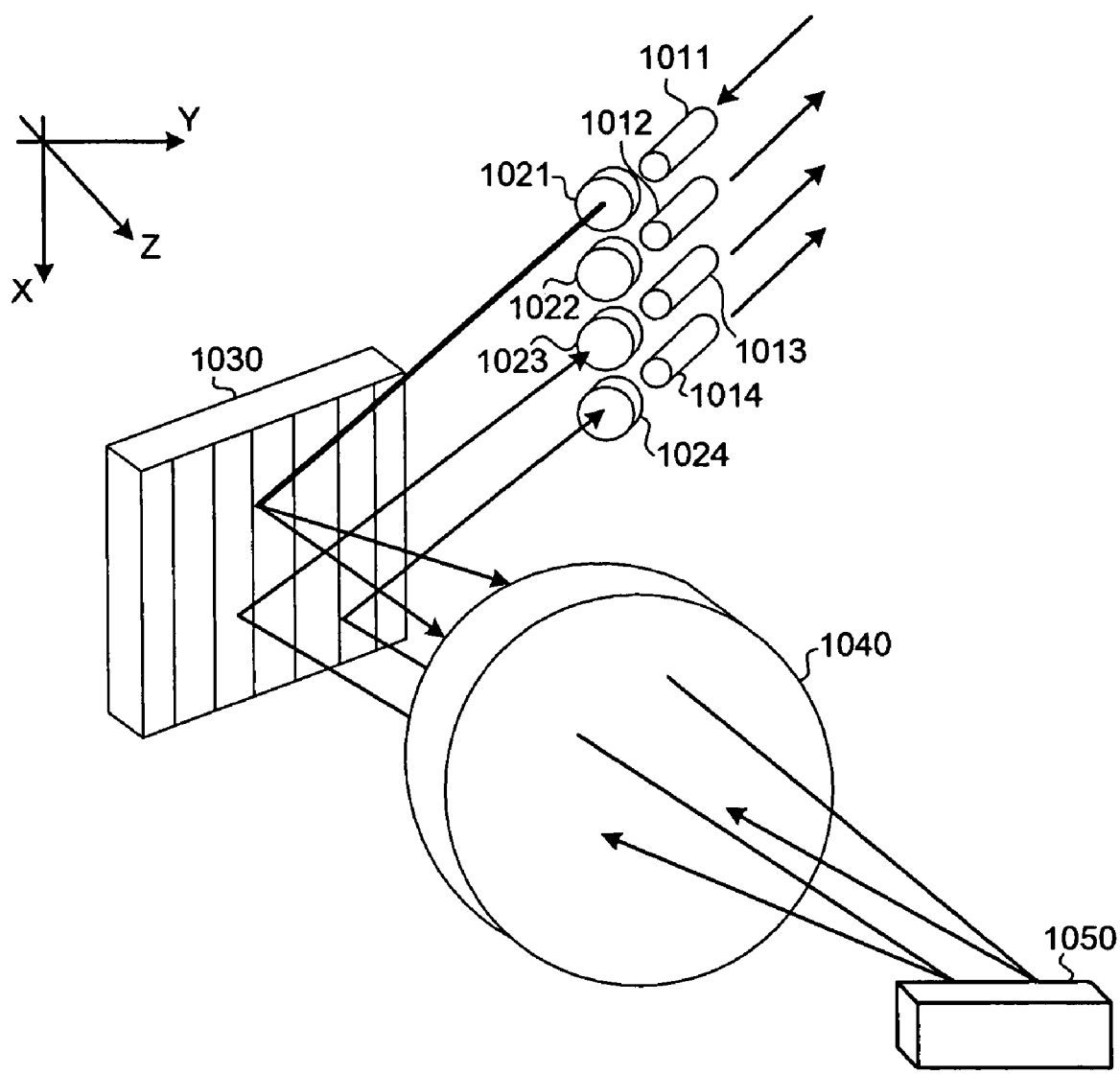
FIG. 10 is perspective view showing a configuration of a conventional optical wavelength selecting switch.

FIG. 6 is a flowchart of an operation of the lens adjusting device 300 to adjust the lens 130. FIG. 7 is a schematic diagram showing the adjustment of the lens 130 performed by the lens adjusting device 300. FIG. 8 is another schematic diagram showing the adjustment of the lens 130 performed by the lens adjusting device 300. The above explanation has been given supposing that the position of lens 130 has already been adjusted so that the light to be received by the measuring unit 310 passes the core 130a of the lens 130. A method of adjusting the lens 130 to obtain such a state is explained below.

As shown in FIG. 6, first, the emitting unit 710 emits collimated light to the measuring unit 310 (step S601). Next, as shown in FIG. 7, the measuring unit 310 receives the collimated light emitted from the emitting unit 710, and measures a position of the optical axis (numeral 701 in FIG. 7) of the received collimated light as the third position (step S602). The third position is to be a reference position when adjusting the lens 130.

Subsequently, as shown in FIG. 8, the arranging unit 810 arranges the lens 130 on the optical path of the collimated light emitted from the emitting unit 710 to the measuring unit 310 (step S603). The measuring unit 310 then receives the light that has been emitted from the emitting unit 710 and has passed through the lens 130, and measures a position of the optical axis (numeral 702 in FIG. 7) of the received light as the fourth position (step S604).

Next, the arranging unit 810 adjusts the position of the lens 130 so that the fourth position coincides with the third position (step S605). Thus, a series of operations ends. By the operation described above, the position of the lens 130 can be adjusted so that light to be received by the measuring unit 310 passes the core 130a of the lens 130.

As described, according to the lens adjusting device of the embodiment, by adjusting a relative position between the position at which the diffusion light emitted from the port unit 110 passes through the lens unit 120 and the position of the core of the lens unit 120, a difference in a position at which light is collected caused by the aberration of the lens 130 can be corrected, thereby reducing the coupling loss at the output port.

As described above, according to the lens adjusting method, the lens adjusting device, and the optical switch, the coupling loss at the output port can be reduced.

While in the embodiment described above, the angle of each collimated light beam that enters the lens 130 is adjusted so that light collected by the lens 130 is collected at one point in the measuring unit 310, as another application of the present invention, if a reference position is determined on the measuring unit 310 for each of the lenses in the lens unit 120 by calculating the aberration of the lens 130, the collimated light beams that enter the lens 130 can be made parallel to each other.

According to the embodiment described above, coupling loss at an output port can be reduced without being influenced by aberration of a collective lens arranged on an optical path.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lens adjusting method for an optical switch that includes a plurality of pairs of ports and first lenses, a second lens, and an inclinable mirror, wherein diffusion light emitted from the ports are respectively collimated by the first lenses, collected into the mirror by the second lens, and reflected by the inclinable mirror to be input to one of the ports, the lens adjusting method comprising:

measuring a first position at which an optical axis of light that passes a core of the second lens is received, and a second position at which an optical axis of light that is collimated by a first lens and does not pass the core is received; and adjusting a position of the first lens so that the second position coincides with the first position.

2. The lens adjusting method according to claim 1, wherein the measuring includes measuring a first distance between the core and a portion of the second lens through which the light collimated by the first lens passes, and the adjusting includes adjusting the position of the first lens based on the first distance.

3. The lens adjusting method according to claim 2, wherein the adjusting includes adjusting the position of the first lens such that a second distance becomes larger as the first distance becomes larger, the second distance being between a core of the first lens and a portion of the first lens though which an optical axis of diffused light emitted from a port paired with the first lens passes.

4. The lens adjusting method according to claim 1, wherein a position of the second lens is determined by measuring a third position at which an optical axis of collimated light is received;

arranging the second lens on an optical path of the collimated light;

measuring a fourth position at which an optical axis of the collimated light that passes the second lens is received; and adjusting the position of the second lens so that the fourth position coincides with the third position.

5. A lens adjusting device for an optical switch that includes a plurality of pairs of ports and first lenses, a second lens, and an inclinable mirror, wherein diffusion light emitted from the ports are respectively collimated by the first lens, collected into the mirror by the second lens, and reflected by the inclinable mirror to be input to one of the ports, the lens adjusting device comprising:

a measuring unit that receives light collected by the second lens and measures a first position at which an optical axis of light that passes a core of the second lens is received, and a second position at which an optical axis of light that is collimated by a first lens and does not pass the core is received; and a first adjusting unit that adjusts a position of the first lens so that the second position coincides with the first position wherein the measuring unit further measures a third position at which collimated light is received before an arrangement of the second lens on an optical path of the collimated light, and a fourth position at which the collimated light that passes through the second lens after the arrangement is received, and the lens adjusting device further comorises a second adjusting unit that adjusts a position of the second lens so that the fourth position coincides with the third position.

6. The lens adjusting device according to claim 5, wherein the measuring unit further measures a first distance between the core and a portion of the second lens through which the light collimated by the first lens passes, and the first adjusting unit adjusts the position of the first lens based on the first distance.

7. The lens adjusting device according to claim 6, wherein the first adjusting unit adjusts the position of the first lens such that a second distance becomes larger as the first distance becomes larger, the second distance being between a core of the first lens and a portion of the first lens though which an optical axis of diffused light emitted from a port paired with the first lens passes.

8. An optical switch comprising the lens adjusting device according to claim 5.

9. The lens adjusting device according to claim 5, wherein the first adjusting unit includes a holding member that holds the first lenses; and a control unit that controls the holding member, the measuring unit outputs information on the first position and the second position to the control unit, and the control unit controls the holding member so that the second position coincides with the first position based on the information.

10. The lens adjusting device according to claim 5, wherein the measuring unit includes any one of a beam profiler, an infrared ray camera, and a position sensitive detector.

* * * * *